United States Patent [19]

Clelland

[11] 3,768,782
[45] Oct. 30, 1973

[54] TANKS FOR LIQUIDS CONTAINING FISSIONABLE MATERIAL

[75] Inventor: David Watson Clelland, Appleton, England

[73] Assignee: United Kingdom Atomic Energy Authority, London, England

[22] Filed: Sept. 3, 1971

[21] Appl. No.: 177,614

[30] Foreign Application Priority Data
Sept. 23, 1970 Great Britain.................. 45,415/70

[52] U.S. Cl....................................... 259/4, 259/97
[51] Int. Cl................................................ B01f 5/12
[58] Field of Search ...................... 259/95, 4, 7, 8, 259/97, 154, 96, 98

[56] References Cited
UNITED STATES PATENTS

| | | | |
|---|---|---|---|
| 1,986,301 | 1/1935 | Stockton........................... | 259/96 X |
| 2,124,983 | 7/1938 | Martin................................. | 259/98 |
| 1,720,549 | 7/1929 | Gilchrist............................. | 259/97 |
| 3,230,589 | 1/1966 | McIlvaine....................... | 259/154 X |
| 2,413,375 | 12/1946 | Pomeroy.............................. | 259/8 |
| 3,172,736 | 3/1965 | Gee et al. ........................ | 259/4 X |
| 3,254,877 | 6/1966 | Goodwin.............................. | 259/8 |

FOREIGN PATENTS OR APPLICATIONS

| | | | |
|---|---|---|---|
| 753,533 | 7/1963 | Canada................................ | 259/8 |
| 460,342 | 1/1937 | Great Britain..................... | 259/7 |

*Primary Examiner*—John Petrakes
*Assistant Examiner*—Philip R. Coe
*Attorney*—Larson, Taylor et al.

[57] ABSTRACT

A high capacity tank for handling liquids containing fissionable material and having recirculating and mixing means which prevent the creation of critical masses.

2 Claims, 1 Drawing Figure

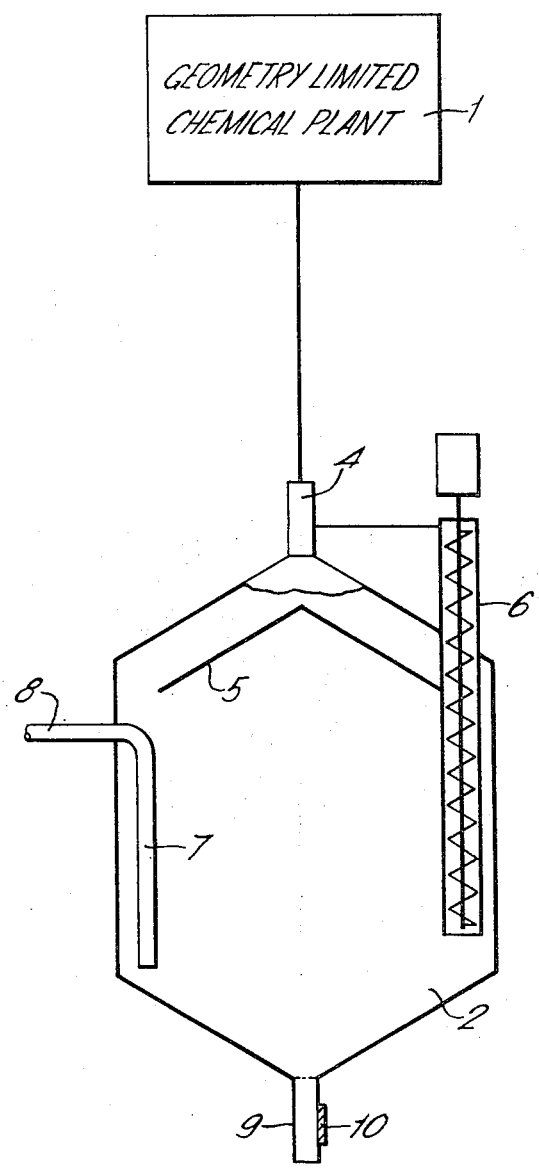

TANKS FOR LIQUIDS CONTAINING FISSIONABLE MATERIAL

BACKGROUND OF THE INVENTION

Chemical plants handling solutions of fissionable materials are often constructed in geometrically safe dimensions so that a critical mass cannot accumulate. Alternatively the volume or mass of the fissionable material may be controlled or neutron poisons may be employed to render the plant safe. Liquids emerging from such plants have to be controlled to ensure safety and for example may be fed into geometrically safe tanks (that is, tanks of such proportions that critical masses cannot be created in the tanks) to be held up during analysis to ensure that they are sufficiently dilute to be discharged to environments where no control of mass, volume, concentration or poison is maintained. As an example three tanks may be employed, one filling whilst the content of a second is being analysed and the third is being emptied. It is an object of the invention to provide apparatus which will enable liquids containing fissionable material to be handled more safely.

SUMMARY OF THE INVENTION

The invention resides in a tank for handling liquid containing fissionable material flowing from chemical plant, the tank having a geometrically limited section forming a liquid inlet in the upper regions, an internal baffle to distribute incoming liquid to the peripheral regions, means for continuously recirculating liquid from the lower regions of the tank to the liquid inlet, and a pipe extending from the lower regions to an overflow outlet port for liquid at the upper regions of the tank. The tank should be of sufficient capacity to hold a maximum credible release of fissionable material in a nominally safe dilute condition and the peripheral distribution and recirculation of liquid will then serve to avoid localised stagnation which creates zonal regions of unsafe concentrations.

DESCRIPTION OF THE DRAWING

A method and apparatus according to the invention for handling liquid which may contain fissionable materials is described, by way of example, with reference to the accompanying diagrammatic drawing.

DESCRIPTION OF THE PREFERRED EMBODIMENT

A geometry limited chemical plant handles 100 Kgs of plutonium per day. The maximum credible release for fissionable material into an effluent stream normally clear of fissionable material is 100 Kgs at the rate of 1 Kg/min. A tank 2 receiving the effluent liquid from the plant has a capacity 20 cubic metres. This volume is sufficient to dilute the maximum credible release 100 Kgs to 5 gms/litre, which is a safe concentration. The tank has a centrally disposed section of geometrically safe proportions which forms a liquid inlet port 4 in its cover and an internal conical baffle 5 immediately below the port 4. There is an Archimedes screw pump 6 installed to lift liquid under a low head at a rate of 200 1/min from the lower regions of the tank to the inlet port 4. A pipe 7 extends from the lower regions of the tank to an overflow outlet port 8 at the upper regions. The base of the tank has a sump 9 of geometrically safe proportions for the accumulation of solids and there is a neutron monitor 10 for indicating when an unacceptable quantity of active solids has accumulated in the sump whereupon the sump can be cleaned out.

The eversafe sea concentration of plutonium bearing liquid is 7 grams per litre. Effluent liquid from the described plant under normal conditions has a negligible Pu content but under the worst emergency conditions carries 1 Kg Pu per min. The effluent liquid is diluted at the inlet 4 to a maximum concentration of 5 gms Pu/litre by liquid lifted from the lower regions of the tank 2. Diluted liquid is distributed to the outer regions by the baffle 5. Liquid is recirculated from the lower regions of the tank to the inlet port 4 by the pump 6 so that a uniform concentration of liquid is maintained throughout the tank. Outflow from the tank is from the lower regions by way of the pipe 7 the outlet port determining the level of liquid in the tank.

I claim:

1. A tank for handling liquid containing fissionable material flowing from chemical plant, the tank comprising:
   a major section for containing diluent liquid,
   a minor section of geometrically safe proportions mounted on the major section and having an inlet port for receiving liquid from the chemical plant and an inlet port for diluent liquid,
   means for distributing liquid flowing from the minor section to the peripheral regions of the major section,
   a pump mounted in the major section and at least partially submerged in the diluent liquid arranged for delivery of diluent liquid to the minor section, and
   a duct extending from the lower regions of the tank to an outlet port for diluted liquid at the upper regions of the tank.

2. A tank according to claim 1 having a sump of geometrically safe proportions in the base of the tank for the accumulation of solids.

* * * * *